United States Patent [19]

Pearch et al.

[11] 4,373,358

[45] Feb. 15, 1983

[54] TORQUE LIMITING MECHANISM

[75] Inventors: Dean A. Pearch, Mt. Pleasant; Thomas F. Pung, Sr., Weidman, both of Mich.

[73] Assignee: Dana Corporation, Toledo, Ohio

[21] Appl. No.: 220,874

[22] Filed: Dec. 29, 1980

[51] Int. Cl.³ .................... F16D 7/02; F16D 11/00
[52] U.S. Cl. ................................ 464/48; 192/111 A
[58] Field of Search .............. 64/30 R, 30 C, DIG. 1; 192/109 R, 109 A, 111 A, 70.25

[56] References Cited

U.S. PATENT DOCUMENTS

| | | | |
|---|---|---|---|
| 2,306,730 | 12/1942 | Holmes | 64/30 R |
| 2,655,015 | 10/1953 | Linder | 64/30 R |
| 3,090,213 | 5/1963 | Lindgren | 64/30 R |
| 3,111,824 | 11/1963 | Firth | 64/30 R |
| 3,406,801 | 10/1968 | Root | 192/111 A X |
| 3,605,443 | 9/1971 | Redelman | 64/30 R |
| 3,946,845 | 3/1976 | Kamio | 192/111 A |

OTHER PUBLICATIONS

"Danly Spring Retainers", from Danly Spring Catalog.

Primary Examiner—Edward J. McCarthy
Attorney, Agent, or Firm—Frank B. McDonald

[57] ABSTRACT

A torque limiting mechanism provides for a spring loaded coupling of driver and driven friction discs for simultaneous and uniform rotation. A spring retainer system is incorporated which provides restraint against expansion of the spring beyond a predetermined limit. In a preferred embodiment the spring becomes inoperative to urge the discs together after friction linings on the discs have worn to a predetermined design limit. A condition of zero torque is thereby created, thus signalling need for replacement of friction linings.

14 Claims, 2 Drawing Figures

TORQUE LIMITING MECHANISM

BACKGROUND

This invention relates to torque limiting devices and particularly to such devices which include axially movable driver and driven friction discs normally urged together by spring forces. Such torque limiters are generally placed in drive lines between prime movers (e.g. electric motors) and the loads driven thereby to provide for direct coupling without slippage until a given torque capacity is reached. Typical spring loaded torque limiters of the friction disc type herein noted are prone to loss of torque capacity as the friction disc become worn over time and as the springs, installed under compression, expand due to the wear of the discs. The resulting torque loss is known to create premature slippage between driver and driven friction discs, thus reducing clutch efficiency and generating unacceptable heat within the unit. Seizure of the limiter may then occur, as well as failure of certain major torque limiter components.

SUMMARY

The torque limiter of this invention incorporates a spring retainer system which restrains the extension of the springs to a predetermined limit. The limit is established by a given amount of acceptable wear of the friction discs consistent with an operating minimum torque capacity value. Thus, at a predetermined wear limit, the springs are automatically restrained from further expansion and the operative torque value drops to zero. The clutch is no longer functional, and thus the need for replacement of friction discs (or friction discs wear pads, alternatively) is signaled. In this manner, torque capacity and clutch efficiency are allowed to deteriorate only within pre-set limits, beyond which there are no slipping or overheating conditions created, which, as aforestated, lead to failures of conventional torque limiters.

DETAILED DESCRIPTION OF PREFERRED EMBODIMENT

Figure 1:
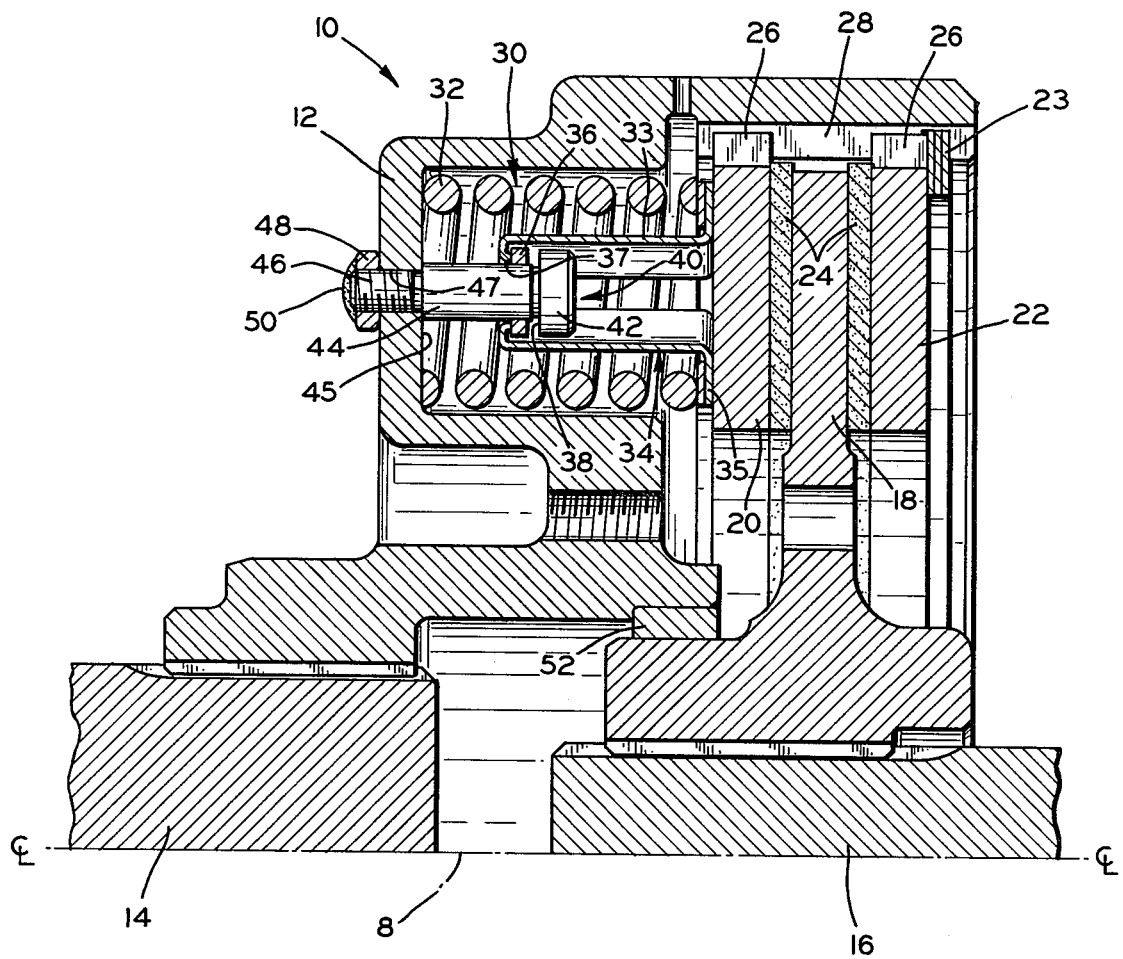
FIG. 1 is a fragmented (top half) cross-sectional elevation view of a clutch drive system incorporating a preferred embodiment of the torque limiting mechanism of this invention.

A preferred embodiment of this invention is incorporated in a clutch drive system 10 as shown in FIG. 1. An input housing 12, splined to an input shaft 14, radially encloses all system components, excluding the input shaft 14 and an output shaft 16. A driven friction disc 18 is floatingly splined to the output shaft 16, thus permitting axial movement of the disc 18 within the housing 12. To the left and right of the disc 18, as shown, rear and forward pressure plates (also called driver friction discs) 20 and 22, respectively, are both splined to the input housing 12. Thus, peripheral pressure plate splines 26 engage mating internal input housing splines 28 to allow axial but non-rotatable relative movement of the latter plates with respect to the housing 12. Interjacent the pressure plates and driven friction disc 18 and bonded to respective pressure plates are replaceable friction wear linings 24. Alternatively, the linings 24 may be bonded to the disc 18 or may comprise free-floating assemblies between the plates and disc.

The input housing 12 is rotatable about the centerline 8 of the input shaft 14, which is rigidly coupled to a prime mover, for example, an electic motor (not shown). It will thus be appreciated that the pressure plates 20 and 22 will rotate with the input housing 12, which houses the plates and permits them to slide axially between a spring assembly module 30 and snap ring 23, as shown. The output friction disc 18 is thus sandwiched between the plates 20 and 22 by biasing forces (as further explained in detail below). The disc 18 as well as plates 20 and 22, are permitted to float axially as required due to friction lining wear.

In the preferred embodiment described, the spring assembly module 30 comprises biasing means, preferably a coil spring 32, a spring retainer 34, and a specially constructed threaded bolt 40. The preferred embodiment of the bolt 40 includes a head 42, an unthreaded intermediate shank portion 44, and a threaded end shank portion 46 of smaller diameter than the unthreaded portion 44. The bolt 40 extends through an internally threaded aperture 47 in the internal wall 45 of the housing 12 via the threaded portion 46 and is externally secured thereto by a nut 48. The nut 48 is preferably permanently fixed to the threaded portion 46 as by a weld bead 50. The retainer 34 is axially aligned with the bolt 40, and is located radially outwardly thereof, the head 42 of the bolt 40 being contained internally of the retainer 34 at all times.

Figure 2:
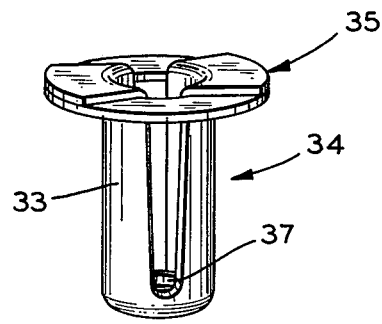
FIG. 2 is a perspective view of a spring retainer as utilized in this invention.

Referring to FIG. 2, the retainer 34 defines a generally cylindrical body 33, having a spring contact portion 35 at one end, and an internal annulus 37 at the opposite end. The underside of the bolt head 42 (FIG. 1) presents a retainer stop or abutment 38, which limits the axial travel of the retainer 34, the latter being urged to the right (as shown) by the spring 32. A spacer washer 36 may optionally be used to control the axial distance between the internal annulus 37 and retainer stop 38. The spring 32 is compressed during assembly into a space bounded by the internal housing wall 45 and the spring contact portion 35. The portion 35, in turn, bears directly against the rear pressure plate 20, as shown.

It may now be seen that as the friction wear linings 24 are worn away, the spring 32 will expand against the retainer to take up slack which results from wear. The retainer 34 will thus be forced axially to the right (as shown), its internal annulus 37 sliding along the unthreaded shank portion 44 of the bolt 40. At some pre-set design limit, preferably established at a point prior to the complete deterioration of the wear linings 34, the internal annulus 37 or space washer 36 will contact the retainer stop 38, thus preventing or arresting any further axial movement of either the spring or retainer.

In the preferred embodiment, a plurality of spring assembly modules are circumferentially and evenly spaced about the annular rear internal wall 45 of the input housing 12 for application of a uniform pressure against the rear pressure plate 20. Also in the preferred embodiment, the output friction disc 18 is piloted by bearings 52 within the input housing 12. Many other operative design arrangements are, however, within the spirit and scope of this invention.

What is claimed is:

1. In a torque limiter of the type including a housing, at least one driven friction disc, one driver friction disc, and axially moveable biasing means for urging said discs together, an improvement comprising means for automatically arresting said biasing means at a predetermined limit of axial movement of said means, said biasing means comprising at least one spring positioned interjacent said housing and said friction discs.

2. The torque limiter of claim 1 wherein said means for automatically arresting said biasing means at said predetermined limit comprises an abutment anchored to said housing, and a slidably movable spring retainer, said retainer being disposed for contact with said abutment at said predetermined limit.

3. The torque limiter of claim 2 wherein said spring retainer comprises a spring contact portion, said spring contact portion being positioned interjacent said spring and said friction discs.

4. The torque limiter of claim 3 wherein said housing comprises means for restricting movement of said driver friction disc to axial movement only relative to said housing.

5. The torque limiter of claim 4 wherein said housing comprises bearing means against which said spring may bear for axially urging against said spring contact portion of said spring retainer.

6. The torque limiter of claim 5 wherein said spring is a coil spring disposed for axially expansive movement relative to said housing, wherein said retainer extends axially through the center thereof, said spring contact portion defining a radially extending annulus.

7. The torque limiter of claim 6 wherein said abutment means comprises a bolt fixed to said housing and extending axially with respect to said retainer, the head thereof being internally of said retainer and disposed for contact with said internal annulus of said retainer at said predetermined limit, the shank of said bolt being disposed for contact with said slidably movable internal annulus.

8. The torque limiter of claim 7 wherein a spacer is positioned intermediate said internal annulus and said abutment means for control of said predetermined limit.

9. The torque limiter of claim 8 wherein means for restricting said driver disc to axial movement only relative to said housing comprises mating splines in each of said driver disc and said housing, respectively.

10. The torque limiter of claim 9 wherein said spring urges said spring contact portion of said retainer against said driver disc, and therethrough urges said driver disc against said driven disc until said predetermined limit is reached.

11. The torque limiter of claim 10 wherein said spring urges said internal annulus of said spring retainer against said abutment means at said predetermined limit.

12. The torque limiter of claim 11 wherein said bearing means of said housing against which said spring contact portion may bear comprises an internal wall portion of said housing.

13. The torque limiter of claim 12 comprising at least two driver discs, said driver discs sandwiching said driven disc between them.

14. The torque limiter of claim 13 further comprising at least one snap ring, said snap ring fixed axially relative to said input housing, wherein said first driver disc is urged by said spring contact portion against said driven disc, said driven disc is thereby urged against said second driver disc, and said second driver disc is thereby urged against said snap ring.

* * * * *